United States Patent [19]

Moller

[11] Patent Number: 5,491,769
[45] Date of Patent: Feb. 13, 1996

[54] METHOD AND APPARATUS FOR VARIABLE MINIFICATION OF AN IMAGE

[75] Inventor: Christian H. L. Moller, Austin, Tex.

[73] Assignee: International Business Machines Corporation, Armonk, N.Y.

[21] Appl. No.: 304,979

[22] Filed: Sep. 12, 1994

Related U.S. Application Data

[63] Continuation of Ser. No. 897,181, Jun. 11, 1992, abandoned.

[51] Int. Cl.[6] .................................................. G06F 15/00
[52] U.S. Cl. .................................................. 395/139
[58] Field of Search ................................... 395/133, 139; 345/127, 128, 129

[56] References Cited

U.S. PATENT DOCUMENTS

| | | | |
|---|---|---|---|
| 4,153,896 | 5/1979 | White | 340/731 |
| 4,503,469 | 3/1985 | Kato | 358/287 |
| 4,532,605 | 7/1985 | Waller | 364/900 |
| 4,569,081 | 2/1986 | Mintzer et al. | 382/47 |
| 4,631,751 | 12/1986 | Anderson et al. | 382/47 |
| 4,633,503 | 12/1986 | Hinman | 364/518 |
| 4,656,664 | 4/1987 | Anderson et al. | 364/518 |
| 4,675,830 | 6/1987 | Hawkins | 364/518 |
| 4,698,778 | 10/1987 | Ito et al. | 364/518 |
| 4,701,808 | 10/1987 | Nagashima | 358/287 |
| 4,754,270 | 6/1988 | Murauchi | 340/731 |
| 4,774,581 | 9/1988 | Shiratsuchi | 358/180 |
| 4,809,083 | 2/1989 | Nagano et al. | 358/287 |
| 4,827,433 | 5/1989 | Kamon | 364/523 |
| 4,833,625 | 5/1989 | Fisher et al. | 364/518 |
| 4,834,374 | 5/1989 | Nakamura et al. | 275/16 |
| 4,907,284 | 3/1990 | Ohuchi | 382/47 |
| 4,935,880 | 6/1990 | Kelleher et al. | 395/166 |
| 4,972,264 | 11/1990 | Bishop et al. | 358/22 |
| 5,239,624 | 8/1993 | Cook et al. | 395/126 |

FOREIGN PATENT DOCUMENTS

| | | |
|---|---|---|
| 63-283956 | 11/1988 | Japan . |
| 1-136465 | 5/1989 | Japan . |
| 1-117568 | 5/1989 | Japan . |

OTHER PUBLICATIONS

"Reduction of Image", by I. Kitazawa et al, *IBM Technical Disclosure Bulletin*, vol. 27, No. 5, Oct. 1984, pp. 3019–3020.

*Primary Examiner*—Phu K. Nguyen
*Attorney, Agent, or Firm*—Thomas E. Tyson; Andrew J. Dillon

[57] ABSTRACT

A method of shrinking an image stored in a first array including the steps of separating the first array into a plurality of rows, each row having a first plurality of data elements, each element having a value, and separately shrinking each row from a first plurality of data elements in the first array to a second plurality of data elements in a second array including the steps of correlating each of the second plurality of data elements to at least one of the first plurality of data elements, and calculating the value of each of the second plurality of data elements from the values of correlated data elements. In addition, an apparatus for shrinking an image stored in a first array including apparatus for separating the first array into a plurality of rows, each row having a first plurality of data elements, each element having a value, and apparatus for separately shrinking each row from a first plurality of data elements in the first array to a second plurality of data elements in a second array including apparatus for correlating each of the second plurality of data elements to at least one of the first plurality of data elements, and apparatus for calculating the value of each of the second plurality of data elements from the values of correlated data elements.

18 Claims, 6 Drawing Sheets

METHOD AND APPARATUS FOR VARIABLE MINIFICATION OF AN IMAGE

This is a continuation of application Ser. No. 07/897,181 filed Jun. 11, 1992 now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

This patent application is related to copending patent application Ser. No. 08/200,839, filed Feb. 22, 1994, entitled "METHOD AND APPARATUS FOR VARIABLE MAGNIFICATION OF AN IMAGE", hereby incorporated by reference.

TECHNICAL FIELD

The present invention relates to image information processing and more particularly to performing variable minification or shrinkage of an image.

BACKGROUND ART

The prior art includes several methods and apparatus for minimizing or shrinking images. Many of these are described below.

U.S. Pat. No. 4,153,896 teaches compressing or expanding an image such as a symbol, character or text, in a first direction followed by compressing or expanding the image in a second direction. The image to be compressed or expanded is divided up by a grid defining a large number of square areas in the image wherein each area is represented by a clock cycle in each direction. The compression or expansion is accomplished by utilizing an averaging circuit which provides a signal indicating the value of the resulting image.

U.S. Pat. No. 4,503,469 teaches a picture image enlarging/reducing system wherein image magnification by a desired factor is achieved by first enlarging the image by a integer factor greater than the desired factor and then multiplying the enlarged image by a correction coefficient corresponding to the ratio of the desired factor to the integer factor.

U.S. Pat. No. 4,656,664 is directed to a method for reducing a binary image by rotating the image 90 degrees, removing one or more rows of bits, modifying rows adjacent to those removed rows to preserve selected information from the discarded line, rotating the image 90 degrees, removing additional rows, and modifying the line adjacent to each line discarded to preserve selected information from the discarded line, and repeating the steps of rotating, removing and modifying a predetermined number of times to achieve a reduction by a desired factor.

U.S. Pat. No. 4,675,830 is directed to a method for producing scalable contour data. The method stretches and compresses character contours to bring specified contour points into proper alignment with a bit map grid.

U.S. Pat. No. 4,809,083 is directed to enlarging or reducing an image at a desired magnification in a facsimile, copying machine or the like. This is accomplished by continuously varying a ratio of a reading resolution to a recording density.

U.S. Pat. No. 4,833,625 is directed to an image viewing station wherein digitized image data at any size from any different modalities is stored in an original format and can be magnified or minified for display to a user. Magnification is performed by producing interpolated image data for each pixel of a magnified image based on the weighted sum of grey levels present of each pixels four nearest neighboring pixels, including pixels from other rows or columns. Minification is performed by discarding pixels to achieve the desired minification.

U.S. Pat. No. 4,972,264 is directed to viewing and overscanned image by storing the original image as a first data block and generating a second data block for display by systematically removing every nth data element where n is an integer less the number of data elements in the first data block.

DISCLOSURE OF THE INVENTION

The present invention includes a method of shrinking an image stored in a first array including the steps of separating the first array into a plurality of rows, each row having a first plurality of data elements, each element having a value, and separately shrinking each row from a first plurality of data elements in the first array to a second plurality of data elements in a second array including the steps of correlating each of the second plurality of data elements to at least one of the first plurality of data elements, and calculating the value of each of the second plurality of data elements from the values of correlated data elements. In addition, the present invention includes an apparatus for shrinking an image stored in a first array including apparatus for separating the first array into a plurality of rows, each row having a first plurality of data elements, each element having a value, and apparatus for separately shrinking each row from a first plurality of data elements in the first array to a second plurality of data elements in a second array including apparatus for correlating each of the second plurality of data elements to at least one of the first plurality of data elements, and apparatus for calculating the value of each of the second plurality of data elements from the values of correlated data elements.

A further understanding of the nature and advantages of the present invention may be realized by reference to the remaining portions of the specification and the drawings.

BEST MODE FOR CARRYING OUT THE INVENTION

Figure 1:
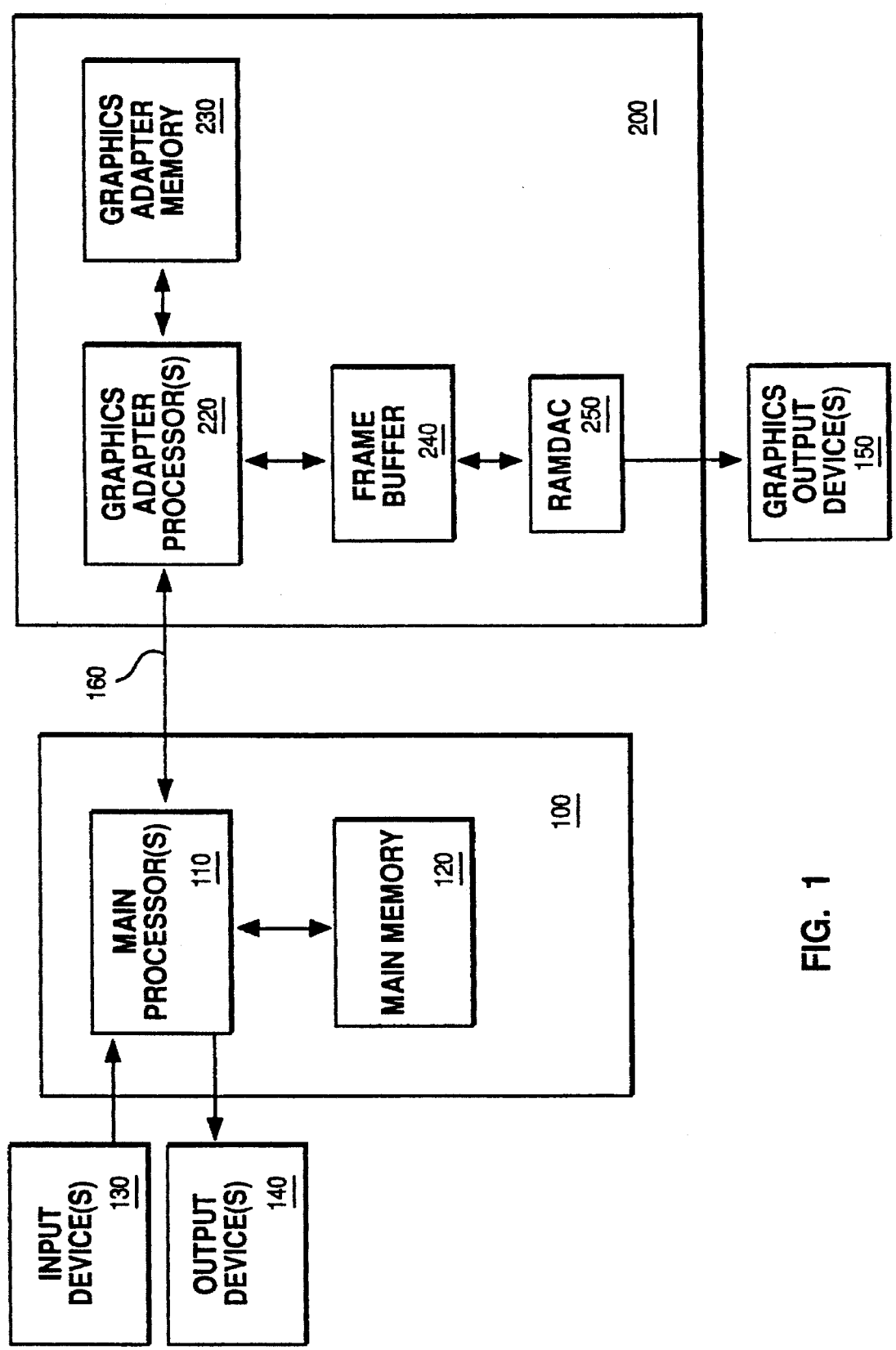
FIG. 1 is a block diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120, input device(s) 130 and output device(s) 140. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 150 such as a graphics display through a graphics adapter 200. Graphics adapter 200 receives instructions regarding graphics from main processor 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphic processors 220 may also include specialized rendering hardware for rendering specific types of primitives to be rendered. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
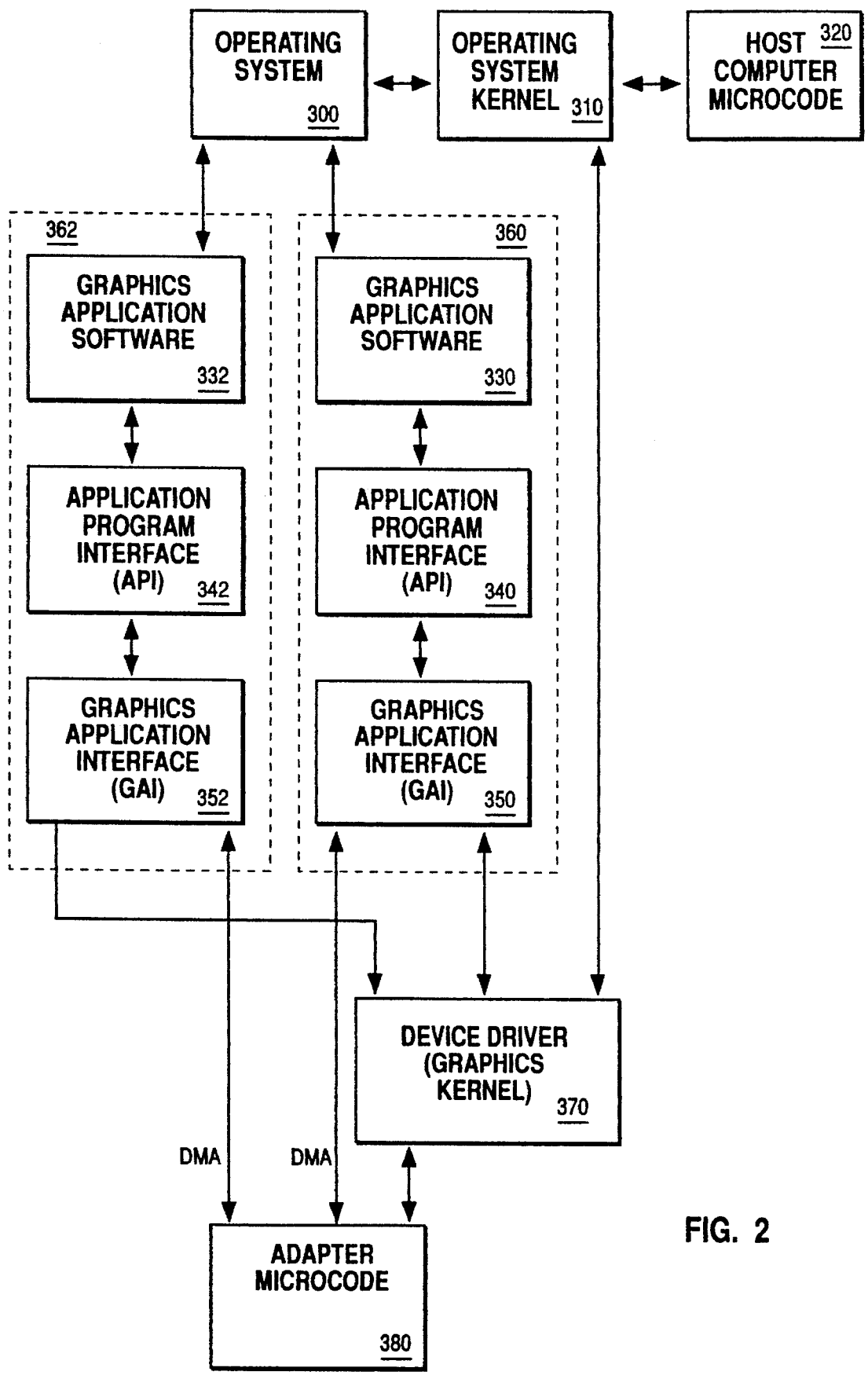
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's, PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 reside on and are executed by the host computer. However, the adapter microcode 380 resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window. The adapter microcode then breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rendered in part or in whole if the window, the user perspective, the model, the lighting, etc. are modified. This also presents a difficulty when trying to shrink a displayed image in the window. In a typical three dimensional model, when a user has an image displayed in a window, a complicated and sometimes time consuming process is followed.

In the preferred embodiment, the shrink technique will be utilized in hardware in the graphics adapter processor. This approach is extremely quick but would probably necessitate specialized hardware. This would allow for rapid shrinks of observed images displayed by the graphics adapter. The shrink technique could also be utilized in many other locations such as the adapter microcode which is close to the adapter frame buffer. This approach would also be relatively quick and fairly easy to implement. In addition, the shrink technique could be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. As would be obvious to one of ordinary skill in the art, the present technique would be applied in many other locations within the host computer or graphics adapter.

Figure 3:
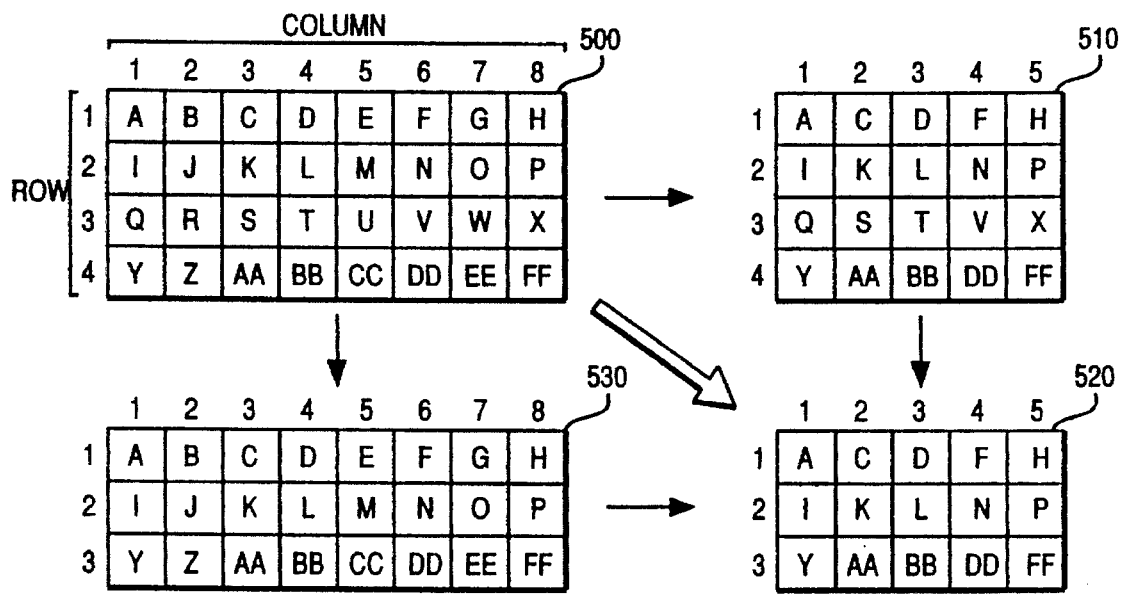
FIG. 3 is an illustration of an image having four rows and eight columns being shrunk to an image having three rows and five columns according to one embodiment of the invention.

FIG. 3 is an illustration of an image having four rows and eight columns being shrunk or minimized into an image having three rows and five columns according to one embodiment of the invention. Horizontal lines of pixels called rows may alternatively be defined as columns and the vertical lines of pixels called columns may alternatively be defined as rows. The Original image 500 is shown with a variable value for each pixel of the image. That is, the pixel on row 1 column 1 has a value of A which may be a grey scale value, an RGB value, or other type of value representing the portion of the image rendered by that pixel.

To perform the shrink, original image 500 is shrunk widthwise into calculated image 510. Calculated image 510 is subsequently shrunk heightwise into new rendered image 520. In the alternative, rendered image 500 may be first shrunk heightwise into calculated image 530 and subsequently shrunk widthwise into new rendered image 520.

Figure 4:
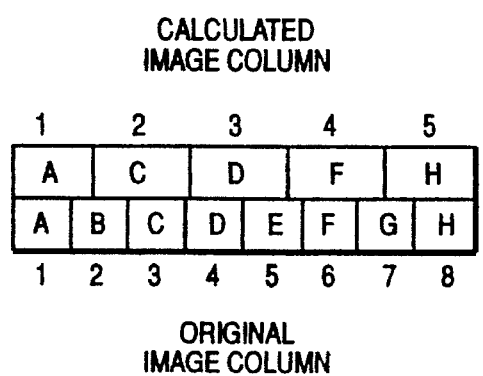
FIG. 4 illustrates an shrinking of a row of an image.

The image is shrunk widthwise or heightwise one row or column at a time. The shrinkage of a row can be understood, as shown in FIG. 4, by imagining the first row of pixels on the original image 500 being placed on a stretched rubber band which is then relaxed and placed under the first row of the calculated image 510.

The end (columns 1 and 8) pixels of row 1 map directly onto the end (columns 1 and 5) pixels of the calculated image and pass their respective pixel values to the calculated image pixels. In addition, the pixels in columns 3 and 6 of original image 500 map well to the pixels in columns 2 and 4 of calculated image 510 and pass their respective pixel values to the calculated image pixels. The pixels in columns 4 and 5 of original image 500 both map well to column 3 of calculated image 510. In this embodiment, the value of the pixel with the lowest column number is selected although the value of the pixel with the highest column number may also be selected. Preferably, the pixels are allocated from the original image to the calculated image from left to right in sequential order as will be described in greater detail below with reference to FIG. 6. As a result of this allocation of pixels from the original image to the calculated image, an excellent and quick shrinkage of the pixel values is performed for the row.

In subsequent steps, the remaining rows of the original image are shrunk into the remaining rows of calculated image 510. After the widthwise shrinkage has been completed, the calculated image 510 is then shrunk heightwise into the new rendered image 520 one column at a time, similar to the widthwise shrinkage of each row, into new image 520.

Figure 5:
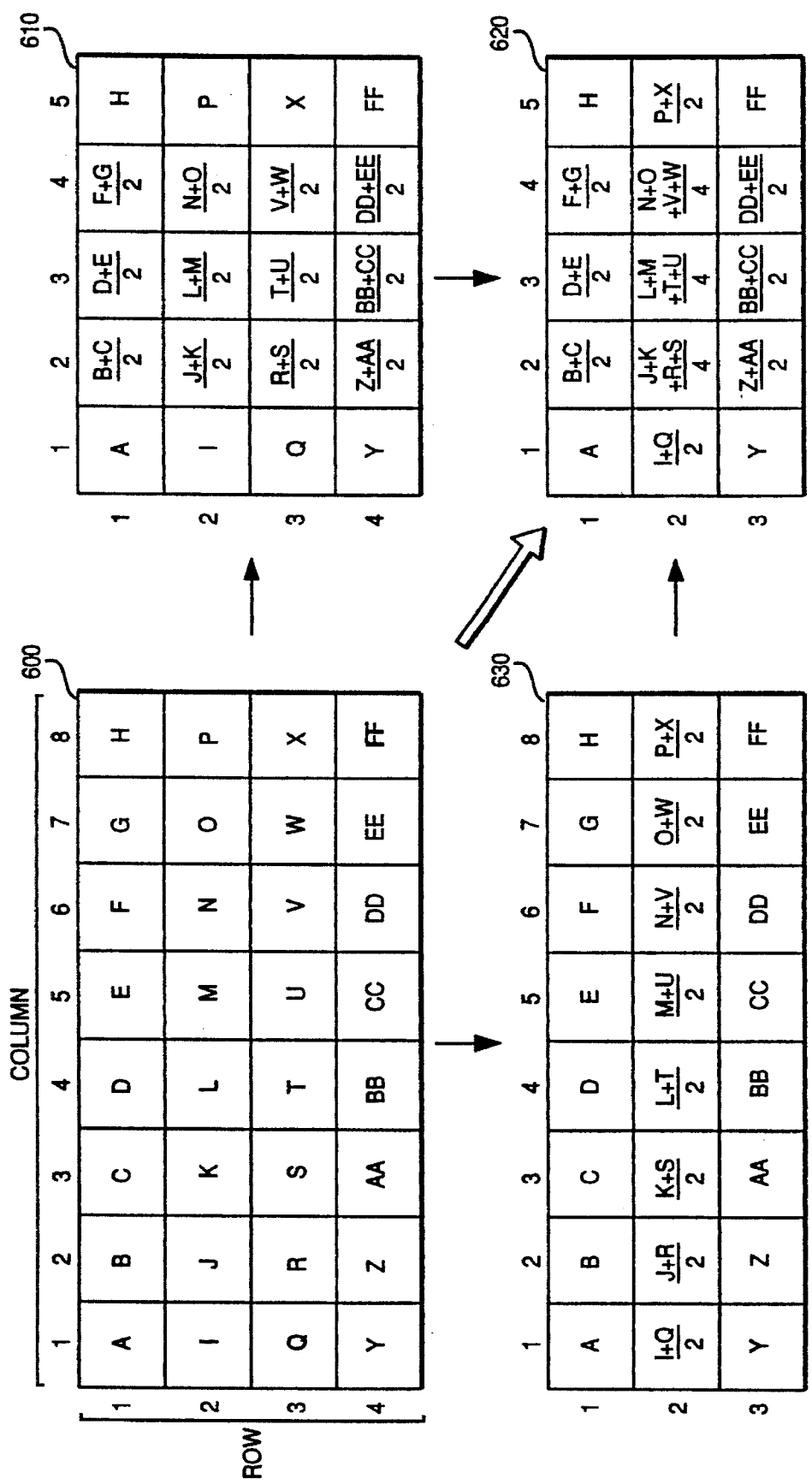
FIG. 5 is an illustration of an image having four rows and eight columns being shrunk to an image having three rows and five columns according to a preferred embodiment of the invention.

FIG. 5 is an illustration of an image having four rows and eight columns being shrunk to an image having three rows and five columns according to a preferred embodiment of the invention. Original image 600 is shown with a variable value for each pixel of the image. That is, the pixel on row 1 column 1 has a value of A which may be a grey scale value, an RGB value, or other type of value representing the portion of the image rendered by that pixel.

As described above with reference to FIG. 3, to perform the shrink, original image 600 is shrunk widthwise into calculated image 610. Calculated image 610 is subsequently shrunk heightwise into new rendered image 620. In the alternative, rendered image 600 may be first shrunk heightwise into calculated image 630 and subsequently shrunk widthwise into new rendered image 620.

The shrinking of row 1 from the original image 600 to calculate image 610 is as follows. The end (columns 1 and 8) pixels of row 1 map directly onto the end (columns 1 and 5) pixels of the calculated image and pass their respective pixel values to the calculated image pixels. The pixels in columns 2 and 3 of original image 600 both map to the pixel in columns 2 and 6 of calculated image 610. The pixels in columns 4 and 5 of original image 600 both map to the pixel in column 3 of calculated image 610. The pixels in columns 6 and 7 of original image 600 both map to the pixel in column 4 of calculated image 610. The pixels in columns 2, 3, and 4 of calculated image 610 are then calculated from pixels 2, 3, 4, 5, 6 and 7 of the original image of original image 600. As can be seen in the illustration, the pixel value in column 2 is calculated as an average of the pixel values in columns 2 and 3. In addition, the pixel value in column 3 is calculated as an average of the pixel values in columns 4 and 5. Furthermore, the pixel value in column 4 is calculated as an average of the pixel values of columns 6 and 7 of the original image. Preferably, the pixels are calculated from the original image to the calculated image from left to right in sequential order as will be described in greater detail below with reference to FIG. 7. As a result of this calculation of pixels from the original image to the calculated image, an excellent shrinking of the pixel values is performed.

As described above with reference to FIG. 3, in subsequent steps, the remaining rows of the original image are shrunk into the remaining rows of calculated image 610. After the widthwise shrinking has been completed, the calculated image 610 is then shrunk heightwise into the new rendered image 620 one column at a time, similar to the widthwise expansion of each row, into new image 620.

Figure 6:
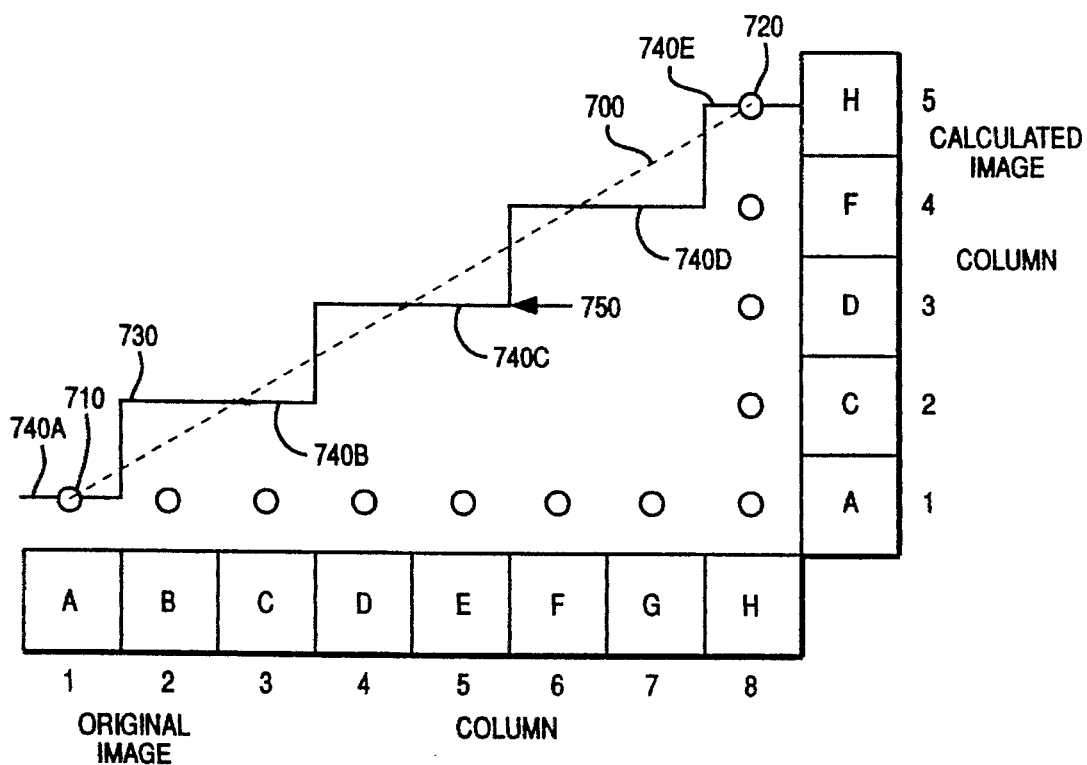
FIG. 6 illustrates how a line draw technique may be used to shrink an image one row or column at a time for the embodiment discussed above with reference to FIG. 3.

FIG. 6 illustrates how a line draw technique may be used to shrink an image one row or column at a time for the embodiment discussed above with reference to FIG. 3.

Current line draw techniques are typically used to efficiently calculate how to draw a line in a two dimensional plane without using floating point arithmetic. However, they can be used to shrink images one row or column at a time. This process of shrinking images using a line draw algorithm for each row or column, one at a time, is quick and if an appropriate line draw algorithm is used, then floating point arithmetic may not be necessary to shrink an image.

In the illustrated example given, the eight pixel wide row from the original image is the X axis and the five pixel wide row from the calculated image is the Y axis and the line draw technique is used to determine where the values of the pixels of the original image row are to be correlated to the pixels of the calculated image row. An ideal line 700 is given for drawing a line from a beginning point 710 at the intersection of Column 1 of the original image and the calculated image to an endpoint 720 at the intersection of Column 5 of the original image and Column 8 of the calculated image. However, since discrete elements (in this case pixels) are used, the ideal line cannot be represented. Therefore, an approximation line 730 is used to approximately represent the ideal line. Many techniques exist to create such an approximation line. For example, a Bresenham algorithm may be used that has the advantage being very quick in many computers because it does not use floating point arithmetic.

The approximation line includes several spans 740A–740E that are calculated sequentially from the starting point 710 to ending point 720. In this embodiment, each span represents which pixel values of the original image are to be correlated to which pixel value of the calculated image. For example, Column 3 of the calculated image is next to span 740C as is shown by intersection point 750. Span 740C represents the pixel values in Columns 4 and 5 of the original image. Therefore, Column 3 of the calculated image obtains the pixel value D as shown. Each of the pixel values are to be determined in sequential order from Column 1 through Column 5 in the present example. That is, once Column 3 of the calculated image is determined, then Column 4 of the calculated image is determined, and so forth in sequential order.

Figure 7:
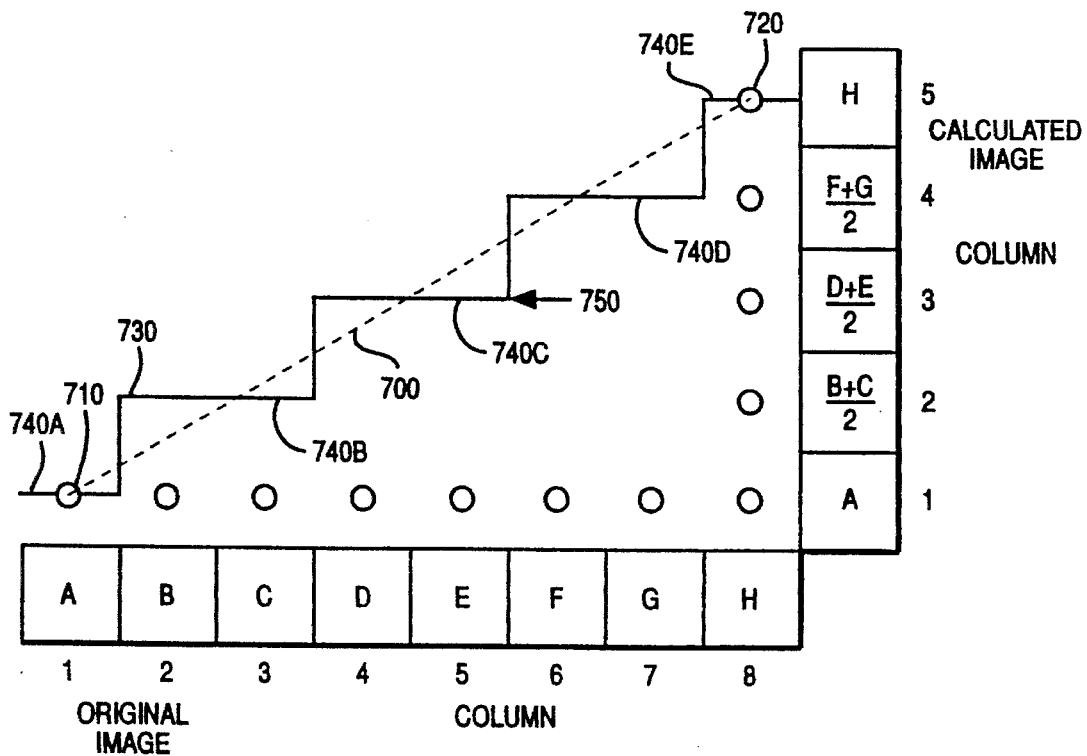
FIG. 7 illustrates how a line draw technique may be used to shrink an image one row or column at a time for the preferred embodiment discussed above with reference to FIG. 5.

This process of determining pixel values using a line draw algorithm for each row or column, one at a time, is quick and if an appropriate line draw algorithm is used, then floating point arithmetic may not be necessary to magnify an image. FIG. 7 illustrates how a line draw technique may be used to shrink an image one row or column at a time for the preferred embodiment discussed above with reference to FIG. 5. The preferred embodiment also utilizes calculation of pixel values to provide a more accurate magnification of an image. This calculation can also be accomplished utilizing a modified line draw technique. This process of shrinking images using a line draw algorithm for each row or column, one at a time, is quick and if an appropriate line draw algorithm is used, then floating point arithmetic may not be necessary to shrink an image.

As described above with reference to FIG. 6, the eight pixel wide row from the original image is the X axis and the five pixel wide row from the calculated image is the Y axis and the line draw technique is used to determine where the values of the pixels of the original image row are to be used to determine the pixel values of the calculated image row. An ideal line 700 is given for drawing a line from a beginning point 710 at the intersection of Column 1 of the original image and the calculated image to an endpoint 720 at the intersection of Column 8 of the original image and Column 5 of the calculated image. An approximation line 730 is used to approximately represent the ideal line.

The approximation line includes several spans 740A–740E that are calculated sequentially from the starting point 710 to ending point 720. Each span is utilized to determine which pixel values of the original image is to used to calculate the pixel value of the calculated image. For example, Column 3 of the calculated image is next to span 740C representing the pixel values in Columns 4 and 5 of the original image as is shown by intersection point 750. Therefore, Column 4 of the calculated image obtains an calculated weighted average pixel value of (D+E)/2 as shown. Each of the pixel values are to be determined in sequential order from Column 1 through Column 5 in the present example. That is, once Column 3 of the calculated image is determined, then Column 4 of the calculated image is determined, and so forth in sequential order.

This process of calculating pixels using a line draw algorithm for each row or column, one at a time, is quick and if an appropriate line draw algorithm is used, then floating point arithmetic may not be necessary to shrink an image. A pseudocode routine implementing the preferred embodiment of the invention is described below with reference to Tables 1A–1B.

Figure 8:
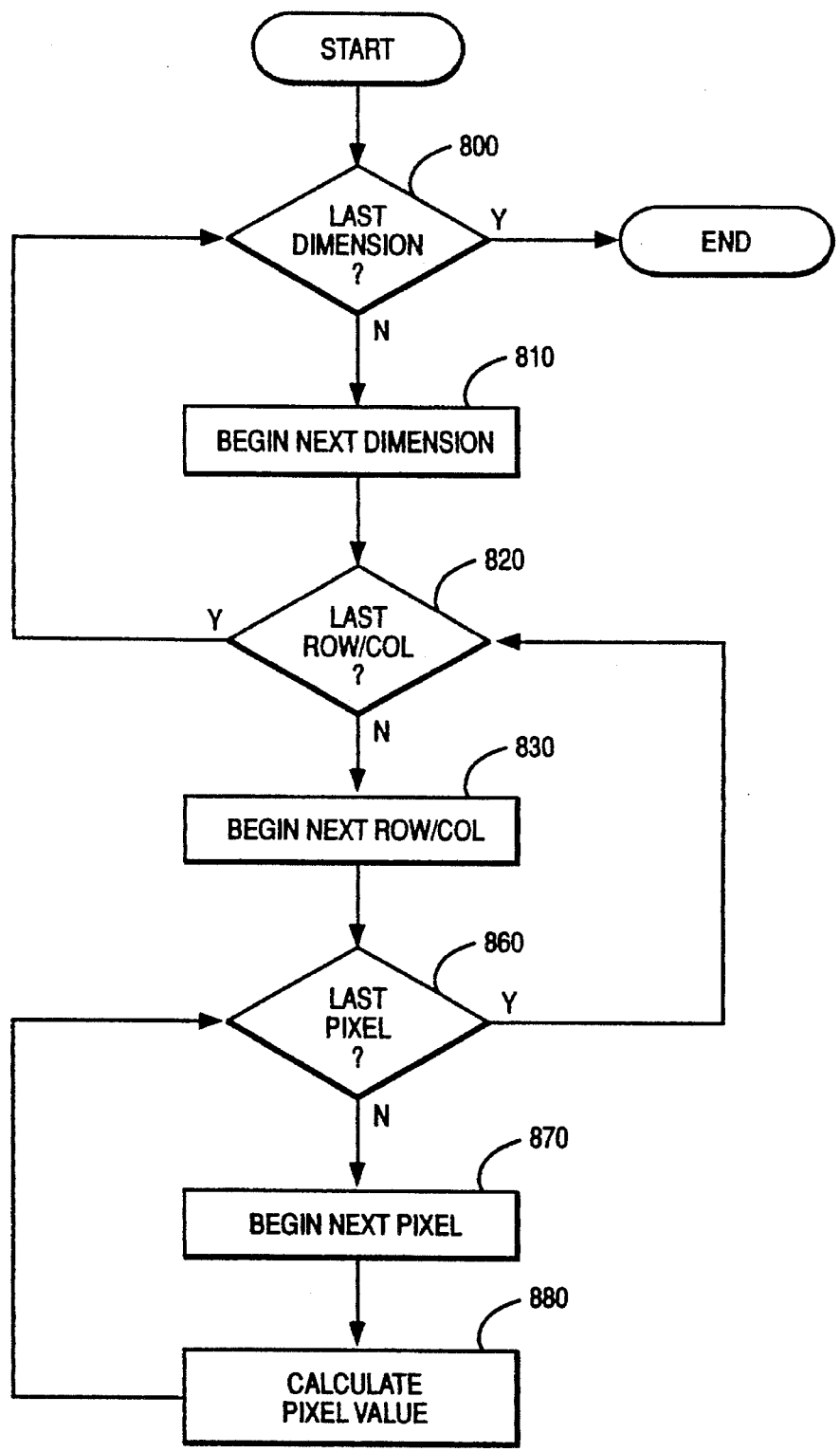
FIG. 8 is a flowchart illustrating how an image is shrunk.

FIG. 8 is a flowchart illustrating how an image is shrunk or minimized. It is noted that the technique is repetitive and lends itself to being performed by a line draw method. In a first step 800, it is determined whether there is a dimension to the image that needs to be shrunk. That is, the flowchart is executed only if the image is to be shrunk in at least one dimension and may be shrunk in many dimensions, such as a three dimensional image that is described by a three dimensional array of data. Assuming there is a dimension remaining to be shrunk, then in step 810, the next dimension of shrinkage is begun by incrementing a counter or calling a subroutine or the like. In step 820, it is determined whether this is the last row or column of data to be shrunk for the current dimension being shrunk. Given that this is the first execution of this step, the answer would be no and the next (first in this case) row or column of data is begun in step 830. In step 860, it is determined whether this is the last pixel to be shrunk for the current row or column of data. Since this is the first execution of this step, the answer would be no. If yes though, execution would return to step 820 to determine whether more rows or columns of data need to be shrunk. In step 870, the next pixel is begun by determining which pixels of the original image correlate to a pixel of the shrunken image. That is, which pixels of the original image are closer to the pixel of the shrunken image than the previous or next pixels. In step 880, the current pixel value of the shrunken image is calculated based on the correlated pixel values and execution is returned to step 860.

In the preferred embodiment, a shrink routine is be called twice to shrink an image in two dimensions, once to shrink the image horizontally and once to shrink the image vertically. With the proper use of variables, the same routine may be used for both operations. Tables 1A–1B provide a pseudocode routine for shrinking an image either horizontally or vertically depending upon the values of the variables passed to the routine. This routine has been split into two tables to allow better explanation of its functionality.

Table 1A is part of a pseudocode routine for initializing variables in preparation for performing the shrink or minimization operation. The procedure receives the following five variables: AXIS, IMAGE, IN_SIZE, OUT_SIZE and NR_STEPS. AXIS is either the value HORIZ or VERT indicating the direction of the shrink to be performed. That is, a value of HORIZ would indicate that the width of the image is being decreased and a value of VERT would indicate that the height of the image is being decreased. IMAGE is an array containing the original pixel data prior to the shrink. If the value of AXIS is HORIZ, then IN_SIZE provides the original width of the pixel array, OUT_SIZE provides the new width of the pixel array after the shrink, and NR_STEPS provides the height of the pixel array. If the value of AXIS is VERT, then IN_SIZE provides the original height of the pixel array, OUT_SIZE provides the new height of the pixel array and NR_STEPS provides the width of the pixel array. Space is then allocated in memory for an array called NEW_IMAGE which is to contain the pixels of the shrunken image upon completion of the shrink routine. The size of NEW_IMAGE is equal to NR_STEPS times OUT_SIZE.

Several constants necessary for performing the zoom are then calculated. ERROR is equal to the error accumulated during the magnification process. POS_DELTA is equal to positive error correction and NEG_DELTA is equal to the negative error correction. N and R are intermediate values used for calculations. SCAN_INC is an offset value that provides the number of entries needed to get to the next entry on the same row in the array.

The outer loop of the shrink routine is then initiated. The outer loop is performed once for each row or column, depending upon whether the shrink is horizontal or vertical. A row or column of data is then set up in working storage for use in calculations. Some loop variables are initialized for each row or column of pixels to be expanded.

TABLE 1A

Initialize Shrink Variables

```
/*      Copyright International Business Machines         */
/*          Corporation, 1992 All Rights Reserved         */
/*                                                        */
/*      procedure shrink: receive shrink variables        */
        Shrink(AXIS.IMAGE,IN_SIZE,OUT_SIZE,NR_STEPS)
/*      allocate space to store the zoomed image          */
        NEW_IMAGE = Allocate (NR_STEPS * OUT_SIZE)
/*      compute constants                                 */
        POS_DELTA = 2 * OUT_SIZE
        NEG_DELTA = POS_DELTA - (2 * IN_SIZE)
        ERROR = POS_DELTA - IN_SIZE
        If (AXIS = HORIZ) then SCAN_INC = 1
        If (AXIS = VERT) then SCAN_INC = NR_STEPS
/*      begin outer loop                                  */
        For I = 0 to NR_STEPS by 1 do
            If (AXIS = HORIZ) then do
                SOURCE_PIX = IMAGE + I * IN_SIZE
                DEST_PIX = NEW_IMAGE + I * OUT_SIZE
            else do
                SOURCE_PIX = IMAGE + I
                DEST_PIX = NEW_IMAGE + I
            RED_SUM = SOURCE_PIX -> RED
            GRN_SUM = SOURCE_PIX -> GRN
            BLU_SUM = SOURCE_PIX -> BLU
            STEP_SUM = 1
/*      continue to table 1B                              */
```

Table 1B is a pseudocode routine for initiating the inner loop of the zoom routine. The inner loop is then begun for each pixel within the outer loop row or column of pixels. The pixel values are then calculated. Then the inner and outer loop are incremented and the final shrunken image is then returned to the calling program.

TABLE 1B

Perform Shrink Inner Loop

```
/*      inner loop                                        */
```

TABLE 1B-continued

Perform Shrink Inner Loop

```
        Do (IN_SIZE) times
            If (ERROR >= 0) then do
                ERROR = ERROR + NEG_DELTA
                DEST_PIX(RED) = RED_SUM/STEP_SUM
                DEST_PIX(GRN) = GRN_SUM/STEP_SUM
                DEST_PIX(BLU) = BLU_SUM/STEP_SUM
                DEST_PIX = DEST_PIX + SCAN_INC
                RED_SUM = SOURCE_PIX(RED)
                GRN_SUM = SOURCE_PIX(GRN)
                BLU_SUM = SOURCE_PIX(BLU)
                STEP_SUM = 1
            else
                ERROR = ERROR + POS_DELTA
                RED_SUM = RED_SUM + SOURCE_PIX(RED)
                GRN_SUM = GRN_SUM + SOURCE_PIX(GRN)
                BLU_SUM = BLU_SUM + SOURCE_PIX(BLU)
                STEP_SUM = STEP_SUM + 1
            SOURCE_PIX = SOURCE_PIX + SCAN_INC
/*      end of inner loop                                 */
        Next IN_SIZE
/*      end of outer loop                                 */
        Next I
/*      return the new array to the caller.               */
        Return (NEW IMAGE)
```

Although the present invention has been fully described above with reference to specific embodiments, other alternative embodiments will be apparent to those of ordinary skill in the art. For example, alternative line draw techniques or methods may be utilized. In addition, alternative averaging techniques such as weighting the accumulated original pixels by a quantity inversely proportional to the corresponding error between the ideal and approximation mapping lines, may be utilized. Therefore, the above description should not be taken as limiting the scope of the present invention which is defined by the appended claims.

What is claimed is:

1. A method of shrinking an image stored in a first array comprising the steps of:

a) separating said first array into a plurality of rows, each row having a first plurality of data elements, each of said first plurality of data elements having a value; and b) separately shrinking each row from the first plurality of data elements in said first array to a second plurality of data elements in a second array including the steps of:
        i) sequentially associating each of said second plurality of data elements with at least one data element within only said first plurality of data elements; and
        ii) sequentially calculating the value of each of said second plurality of data elements from values of associated ones of said first plurality of data elements.

2. The method of claim 1 further comprising the steps of:

a) separating said second array into a plurality of columns, each column having a third plurality of data elements, each of said third plurality of data elements having a value; and b) separately shrinking each column from the third plurality of data elements in said second array to a fourth plurality of data elements in a third array including the steps of:
        i) sequentially associating each of said fourth plurality of data elements with at least one data element within only said third plurality of data elements; and
        ii) sequentially calculating the value of each of said fourth plurality of data elements from values of associated ones of said third plurality of data elements.

3. The method of shrinking an image of claim 2, wherein said step of sequentially associating comprises:

constructing an association graph having an intersecting pair of orthogonal axes, wherein said third plurality of data elements are distributed along a first axis among said pair of axes with a last data element among said third plurality of data elements adjacent said intersection, and wherein said fourth plurality of data elements are distributed along a second of said pair of axes with a first data element among said fourth plurality of data elements adjacent said intersection;

determining an approximation of a line extending between a first data element within said third plurality of data elements and a last data element among said fourth plurality of data elements, said approximation of said line including a number of spans parallel to said first axis equal to a number of data elements within said fourth plurality of data elements, wherein each of said number of spans is aligned with a corresponding one of said second plurality of data elements distributed along said second axis; and associating each of said fourth plurality of data elements with a data element within said third plurality of data elements, wherein a particular one of said fourth plurality of data elements is associated with a data element among said third plurality of data elements which corresponds to a span aligned with said particular data element.

4. The method of claim 2 wherein said steps of calculating includes averaging the value of each of said second and fourth plurality of data elements from the values of the associated data elements.

5. The method of claim 2 wherein said steps of shrinking include shrinking without utilizing floating point arithmetic.

6. The method of shrinking an image of claim 1, wherein said step of sequentially associating comprises:

constructing an association graph having an intersecting pair of orthogonal axes, wherein said first plurality of data elements are distributed along a first axis among said pair of axes with a last data element among said first plurality of data elements adjacent said intersection, and wherein said second plurality of data elements are distributed along a second of said pair of axes with a first data element among said second plurality of data elements adjacent said intersection;

determining an approximation of a line extending between a first data element within said first plurality of data elements and a last data element among said second plurality of data elements, said approximation of said line including a number of spans parallel to said first axis equal to a number of data elements within said second plurality of data elements, wherein each of said number of spans is aligned with a corresponding one of said second plurality of data elements distributed along said second axis; and associating each of said second plurality of data elements with one or more data elements within said first plurality of data elements, wherein a particular one of said second plurality of data elements is associated with one or more data elements among said first plurality of data elements which correspond to a span aligned with said particular data element.

7. An apparatus for shrinking an image stored in a first array comprising:

a) means for separating said first array into a plurality of rows, each row having a first plurality of data elements, each of said first plurality of data elements having a value; and b) means for separately shrinking each row from the first plurality of data elements in said first array to a second plurality of data elements in a second array including:
   i) means for sequentially associating each of said second plurality of data elements with at least one data element within only said first plurality of data elements; and
   ii) means for sequentially calculating the value of each of said second plurality of data elements from values of associated ones of said first plurality of data elements.

8. The apparatus of claim 7 further comprising:

a) means for separating said second array into a plurality of columns, each column having a third plurality of data elements, each of said third plurality of data elements having a value; and b) means for separately shrinking each column from the third plurality of data elements in said second array to a fourth plurality of data elements in a third array including:
   i) means for sequentially associating each of said fourth plurality of data elements with at least one data element within only said third plurality of data elements; and
   ii) means for sequentially calculating the value of each of said fourth plurality of data elements from values of associated ones of said third plurality of data elements.

9. The apparatus of claim 8 wherein said means for calculating includes means for averaging the value of each of said second and fourth plurality of data elements from the values of the associated data elements.

10. The apparatus of claim 8 wherein said means for shrinking include means for shrinking without utilizing floating point arithmetic.

11. The apparatus for shrinking an image of claim 8, wherein said means for sequentially associating comprises:

means for constructing an association graph having an intersecting pair of orthogonal axes, wherein said third plurality of data elements are distributed along a first among said pair of axes with a last data element among said third plurality of data elements adjacent said intersection, and wherein said fourth plurality of data elements are distributed along a second of said pair of axes with a first data element among said fourth plurality of data elements adjacent said intersection;

means for determining an approximation of a line extending between a first data element within said third plurality of data elements and a last data element among said fourth plurality of data elements, said approximation of said line including a number of spans parallel to said first axis equal to a number of data elements within said fourth plurality of data elements, wherein each of said number of spans is aligned with a corresponding one of said second plurality of data elements distributed along said second axis; and means for associating each of said fourth plurality of data elements with one or more data elements within said third plurality of data elements, wherein a particular one of said fourth plurality of data elements is associated with one or more data elements among said third plurality of data elements which correspond to a span aligned with said particular data element.

12. The apparatus for shrinking an image of claim 7, wherein said means for sequentially associating comprises:

means for constructing an association graph having an intersecting pair of orthogonal axes, wherein said first plurality of data elements are distributed along a first axis among said pair of axes with a last data element among said first plurality of data elements adjacent said intersection, and wherein said second plurality of data elements are distributed along a second of said pair of axes with a first data element among said second plurality of data elements adjacent said intersection;

means for determining an approximation of a line extending between a first data element within said first plurality of data elements and a last data element among said second plurality of data elements, said approximation of said line including a number of spans parallel to said first axis equal to a number of data elements within said second plurality of data elements, wherein each of said number of spans is aligned with a corresponding one of said second plurality of data elements distributed along said second axis; and means for associating each of said second plurality of data elements with one or more data elements within said first plurality of data elements, wherein a particular one of said second plurality of data elements is associated with one or more data elements among said first plurality of data elements which correspond to a span aligned with said particular data element.

13. A data processing system for shrinking an image stored in a first array comprising:

a) a processor for processing data;

b) a memory for storing data to be processed;

c) means for separating said first array into a plurality of rows, each row having a first plurality of data elements, each of said first plurality of data elements having a value; and d) means for separately shrinking each row from the first plurality of data elements in said first array to a second plurality of data elements in a second array including:
  i) means for sequentially associating each of said second plurality of data elements with at least one data element within only said first plurality of data elements; and
  ii) means for sequentially calculating the value of each of said second plurality of data elements from values of associated ones of said first plurality of data elements.

14. The data processing system of claim 13 further comprising:

a) means for separating said second array into a plurality of columns, each column having a third plurality of data elements, each of said third plurality of data elements having a value; and b) means for separately shrinking each column from the third plurality of data elements in said second array to a fourth plurality of data elements in a third array including:
  i) means for sequentially associating each of said fourth plurality of data elements with at least one data element within only said third plurality of data elements; and
  ii) means for sequentially calculating the value of each of said fourth plurality of data elements from values of associated ones of said third plurality of data elements.

15. The data processing system of claim 14 wherein said means for calculating includes means for averaging the value of each of said second and fourth plurality of data elements from the values of the associated data elements.

16. The data processing system of claim 14 wherein said means for shrinking include means for shrinking without utilizing floating point arithmetic.

17. The data processing system for shrinking an image of claim 14, wherein said means for sequentially associating comprises:

means for constructing an association graph having an intersecting pair of orthogonal axes, wherein said third plurality of data elements are distributed along a first axis among said pair of axes with a last data element among said third plurality of data elements adjacent said intersection, and wherein said second plurality of data elements are distributed along a second of said pair of axes with a first data element among said fourth plurality of data elements adjacent said intersection;

means for determining an approximation of a line extending between a first data element within said third plurality of data elements and a last data element among said fourth plurality of data elements, said approximation of said line including a number of spans parallel to said first axis equal to a number of data elements within said fourth plurality of data elements, wherein each of said number of spans is aligned with a corresponding one of said fourth plurality of data elements distributed along said second axis; and means for associating each of said fourth plurality of data elements with one or more data elements within said third plurality of data elements, wherein a particular one of said fourth plurality of data elements is associated with one or more data elements among said third plurality of data elements which correspond to a span aligned with said particular data element.

18. The data processing system for shrinking an image of claim 13, wherein said means for sequentially associating comprises:

means for constructing an association graph having an intersecting pair of orthogonal axes, wherein said first plurality of data elements are distributed along a first axis among said pair of axes with a last data element among said first plurality of data elements adjacent said intersection, and wherein said second plurality of data elements are distributed along a second of said pair of axes with a first data element among said second plurality of data elements adjacent said intersection;

means for determining an approximation of a line extending between a first data element within said first plurality of data elements and a last data element among said second plurality of data elements, said approximation of said line including a number of spans parallel to said first axis equal to a number of data elements within said second plurality of data elements, wherein each of said number of spans is aligned with a corresponding one of said second plurality of data elements distributed along said second axis; and means for associating each of said second plurality of data elements with one or more data elements within said first plurality of data elements, wherein a particular one of said second plurality of data elements is associated with one or more data elements among said first plurality of data elements which correspond to a span aligned with said particular data element.

* * * * *